(12) United States Patent
Chung et al.

(10) Patent No.: US 12,541,524 B2
(45) Date of Patent: *Feb. 3, 2026

(54) RANKING NOTIFICATIONS IN A SOCIAL NETWORK FEED

(71) Applicant: Snap Inc., Santa Monica, CA (US)

(72) Inventors: Jaewook Chung, Mountain View, CA (US); Wisam Dakka, San Francisco, CA (US); Andrei Damian, San Francisco, CA (US); Jiwoon Jeon, Torrance, CA (US); Ranveer Kunal, San Francisco, CA (US); Andre Madeira, Saratoga, CA (US); Michael Brian Murray, Marina Del Rey, CA (US); Emre Yamangil, San Francisco, CA (US); Diwakar Punjani, Las Altos, CA (US); Yantao Zheng, Cupertino, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/733,688

(22) Filed: Jun. 4, 2024

(65) Prior Publication Data

US 2024/0320228 A1 Sep. 26, 2024

Related U.S. Application Data

(63) Continuation of application No. 17/387,134, filed on Jul. 28, 2021, now Pat. No. 12,038,932, which is a
(Continued)

(51) Int. Cl.
*G06F 16/2457* (2019.01)
*G06Q 50/00* (2024.01)
*H04L 67/50* (2022.01)

(52) U.S. Cl.
CPC ...... *G06F 16/24578* (2019.01); *H04L 67/535* (2022.05); *G06Q 50/01* (2013.01)

(58) Field of Classification Search
CPC .......... G06F 16/24578; G06F 16/2457; H04L 67/22; H04L 67/50; G06Q 50/01; G06Q 50/00
(Continued)

(56) References Cited

U.S. PATENT DOCUMENTS 11,106,686 B1 8/2021 Chung et al.
2012/0150837 A1* 6/2012 Radlinski .............. G06F 16/951
707/E17.084

(Continued)

OTHER PUBLICATIONS

"U.S. Appl. No. 16/203,548, 312 Amendment filed Jul. 28, 2021", 9 pgs.
"U.S. Appl. No. 16/203,548, Advisory Action mailed Dec. 30, 2020", 3 pgs.
"U.S. Appl. No. 16/203,548, Final Office Action mailed Oct. 26, 2020", 24 pgs.
"U.S. Appl. No. 16/203,548, Non Final Office Action mailed Jul. 2, 2020", 17 pgs.
"U.S. Appl. No. 16/203,548, Notice of Allowance mailed Apr. 29, 2021", 16 pgs.
(Continued)

*Primary Examiner* — Kuen S Lu
(74) *Attorney, Agent, or Firm* — Schwegman Lundberg & Woessner, P.A.

(57) ABSTRACT

Disclosed are implementations for ranking a feed in a social network. In one aspect, a method of generating a feed includes identifying a group of users associated with a first user, identify notifications for the first user based on the group of users, determine one or more actions that may result from each of the identified notifications, rank the notifications based on the one or more determined actions; and display the notifications to the first user according to the ranking.

20 Claims, 14 Drawing Sheets

Related U.S. Application Data continuation of application No. 16/203,548, filed on Nov. 28, 2018, now Pat. No. 11,106,686.

(60) Provisional application No. 62/591,666, filed on Nov. 28, 2017.

(58) Field of Classification Search
USPC .......................................................... 707/748
See application file for complete search history.

(56) References Cited

U.S. PATENT DOCUMENTS

| | | | | |
|---|---|---|---|---|
| 2012/0166432 | A1* | 6/2012 | Tseng | G06F 16/9535 |
| | | | | 707/E17.084 |
| 2013/0346545 | A1* | 12/2013 | Petersen | G06F 16/9538 |
| | | | | 709/217 |
| 2014/0207564 | A1* | 7/2014 | Dubey | G06Q 30/0251 |
| | | | | 705/14.43 |
| 2015/0149544 | A1* | 5/2015 | Zhang | G06Q 10/109 |
| | | | | 709/204 |
| 2015/0302456 | A1* | 10/2015 | Rego | G06Q 30/0235 |
| | | | | 705/14.35 |
| 2016/0239738 | A1* | 8/2016 | Feng | G06F 16/24578 |
| 2016/0350669 | A1* | 12/2016 | Jurka | G06F 16/9535 |
| 2017/0161281 | A1* | 6/2017 | Bhartia | H04W 4/21 |
| 2017/0205964 | A1* | 7/2017 | Rivero | H04L 67/567 |
| 2021/0357418 | A1 | 11/2021 | Chung et al. | |

OTHER PUBLICATIONS

"U.S. Appl. No. 16/203,548, PTO Response to Rule 312 Communication mailed Aug. 3, 2021", 1 pg.

"U.S. Appl. No. 16/203,548, PTO Response to Rule 312 Communication mailed Aug. 9, 2021", 2 pgs.

"U.S. Appl. No. 16/203,548, Response filed Sep. 1, 2020 to Non Final Office Action mailed Jul. 2, 2020", 10 pgs.

"U.S. Appl. No. 16/203,548, Response filed Dec. 18, 2020 to Final Office Action mailed Oct. 26, 2020", 12 pgs.

"U.S. Appl. No. 17/387,134, Examiner Interview Summary mailed May 12, 2023", 2 pgs.

"U.S. Appl. No. 17/387,134, Final Office Action mailed Feb. 22, 2023", 34 pgs.

"U.S. Appl. No. 17/387,134, Non Final Office Action mailed Aug. 29, 2022", 32 pgs.

"U.S. Appl. No. 17/387,134, Non Final Office Action mailed Nov. 22, 2023", 18 pgs.

"U.S. Appl. No. 17/387,134, Notice of Allowance mailed Mar. 5, 2024", 12 pgs.

"U.S. Appl. No. 17/387,134, Response filed Feb. 14, 2024 to Non Final Office Action mailed Nov. 22, 2023", 9 pgs.

"U.S. Appl. No. 17/387,134, Response filed May 22, 2023 to Final Office Action mailed Feb. 22, 2023", 12 pgs.

"U.S. Appl. No. 17/387,134, Response filed Nov. 29, 2022 to Non Final Office Action mailed Aug. 29, 2022", 11 pgs.

* cited by examiner

RANKING NOTIFICATIONS IN A SOCIAL NETWORK FEED

CROSS REFERENCE TO RELATED APPLICATIONS

This application is a continuation of U.S. patent application Ser. No. 17/387,134, filed Jul. 28, 2021, which is a continuation of U.S. patent application Ser. No. 16/203,548, filed Nov. 28, 2018, now issued as U.S. Pat. No. 11,106,686, which claims priority to U.S. Provisional Application Ser. No. 62/591,666, filed Nov. 28, 2017. The contents of the prior applications are considered part of this application, and are hereby incorporated by reference in their entireties.

TECHNICAL FIELD

The present disclosure generally relates to the technical field of prioritizing information. In particular, this disclosure solves the technical problem of sorting notifications in a data stream.

BACKGROUND

As the popularity of social networking grows, users are obtaining more information from their social networks. Users are presented with a large volume of information via their social network connections. In some circumstances, the volume is so large it may be necessary to prioritize the information for the user. Therefore, improved methods of determining how to prioritize information for display to a user are needed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1:
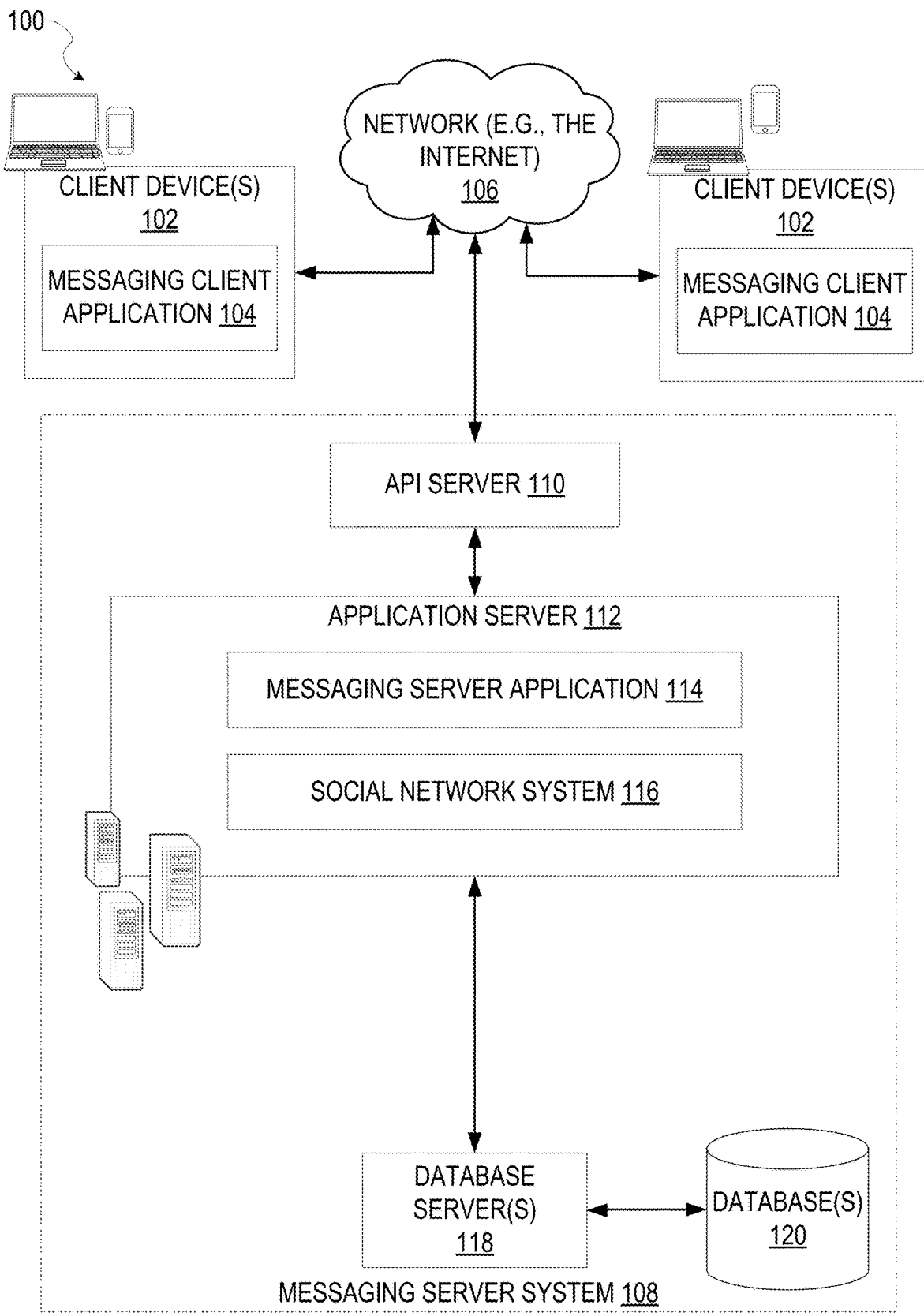
FIG. 1 is a block diagram showing an example messaging system for exchanging data (e.g., messages and associated content) over a network, according to some embodiments.

The description that follows includes systems, methods, techniques, instruction sequences, and computing machine program products that illustrate embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Disclosed are methods and systems for displaying content within feed of a social network. Displaying highly relevant content to a user in a timely fashion can be a challenging technical problem. Determining relevant content can include analyzing a large amount of data, including data representing past viewing habits of the user, as well as other users similarly situated to the user. This analyzing process can take some time. If too much analyzing is required after a user requests to view content, such as by viewing a feed of a social network, undesirable latency may be present in their experience.

To solve this technical problem, the disclosed embodiments pre-generate or predetermine rankings for groups or clusters of users, before those users necessarily request to view content. Then later, when the users do request content for viewing, the rankings are already created and available for use in satisfying the request with very low latency.

While this disclosed solution does provide a highly relevant set of content for display with low latency, since the content ranking is generated based on a certain number or plurality of users, it is selected for use for a particular user based on a "best fit" method. In other words, the system does not generate a predetermined ranking specific for every user, but instead generates clusters of users, and then generates a ranking for each cluster or at least most clusters. Thus, there may be some "misfit" between a particular user's interests and content provided by their "best fit" cluster or value set.

To solve this problem, some of the disclosed embodiments blend the predetermined ranking of content with another ranking that is generated based on content viewing activity specific for the particular user. Such embodiments are thus more targeted and more precisely adapted to the particular user's preferences. To avoid the generation of this second ranking from continuing too much latency to the user's viewing experience, the second ranking considers content view activity from a smaller time frame than the predetermined ranking. Additionally, the second ranking may be continuously updated as the user requests content to view. Thus, there may not be substantial additional processing required to deliver the second ranking when a user requests content. By blending a first predetermined ranking with a second, user-specific and real-time determined ranking, the user has a user experience that represents the best of both worlds. The user is able to view content defined by not only the user's personal viewing preferences, but also content viewed by other users who have similar interests. This content is also provided with relatively low latency given the predetermined rankings, which do not need to be determined after the user requests content to view.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet). As used herein, the term "client device" may refer to any machine that interfaces with a communications network (such as the network 106) to obtain resources from one or more server systems or other client devices. A client device may be, but is not limited to, a mobile phone, desktop computer, laptop, portable digital assistant (PDA), smart phone, tablet, ultra book, netbook, laptop, multi-processor system, microprocessor-based or programmable consumer electronics system, game console, set-top box, or any other communication device that a user may use to access a network.

In the example shown in FIG. 1, each messaging client application 104 is able to communicate and exchange data with another messaging client application 104 and with the messaging server system 108 via the network 106. The data exchanged between the messaging client applications 104, and between a messaging client application 104 and the messaging server system 108, includes functions (e.g., commands to invoke functions) as well as payload data (e.g., text, audio, video, or other multimedia data).

The network 106 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 106 or a portion of the network 106 may include a wireless or cellular network and the connection to the network 106 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third-Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long-Term Evolution (LTE) standard, or others defined by various standard-setting organizations, other long-range protocols, or other data transfer technology.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Programming Interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the application server 112, for possible access by another messaging client application 104; the setting of a collection of media data (e.g., story); the retrieval of a list of friends of a user of a client device 102; the retrieval of such collections; the retrieval of messages and content; the adding and deletion of friends to and from a social graph; the location of friends within a social graph; and the detecting of an application event (e.g., relating to the messaging client application 104).

The application server 112 hosts a number of applications and subsystems, including a messaging server application 114 and a social network system 116. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The social network system 116 supports various social networking functions and services, and makes these functions and services available to the messaging server application 114. To this end, the social network system 116 maintains and accesses an entity graph within the database 120. Examples of functions and services supported by the social network system 116 include the identification of other users of the messaging system 100 with whom a particular user has relationships or whom the user is "following," and also the identification of other entities and interests of a particular user.

Figure 2:
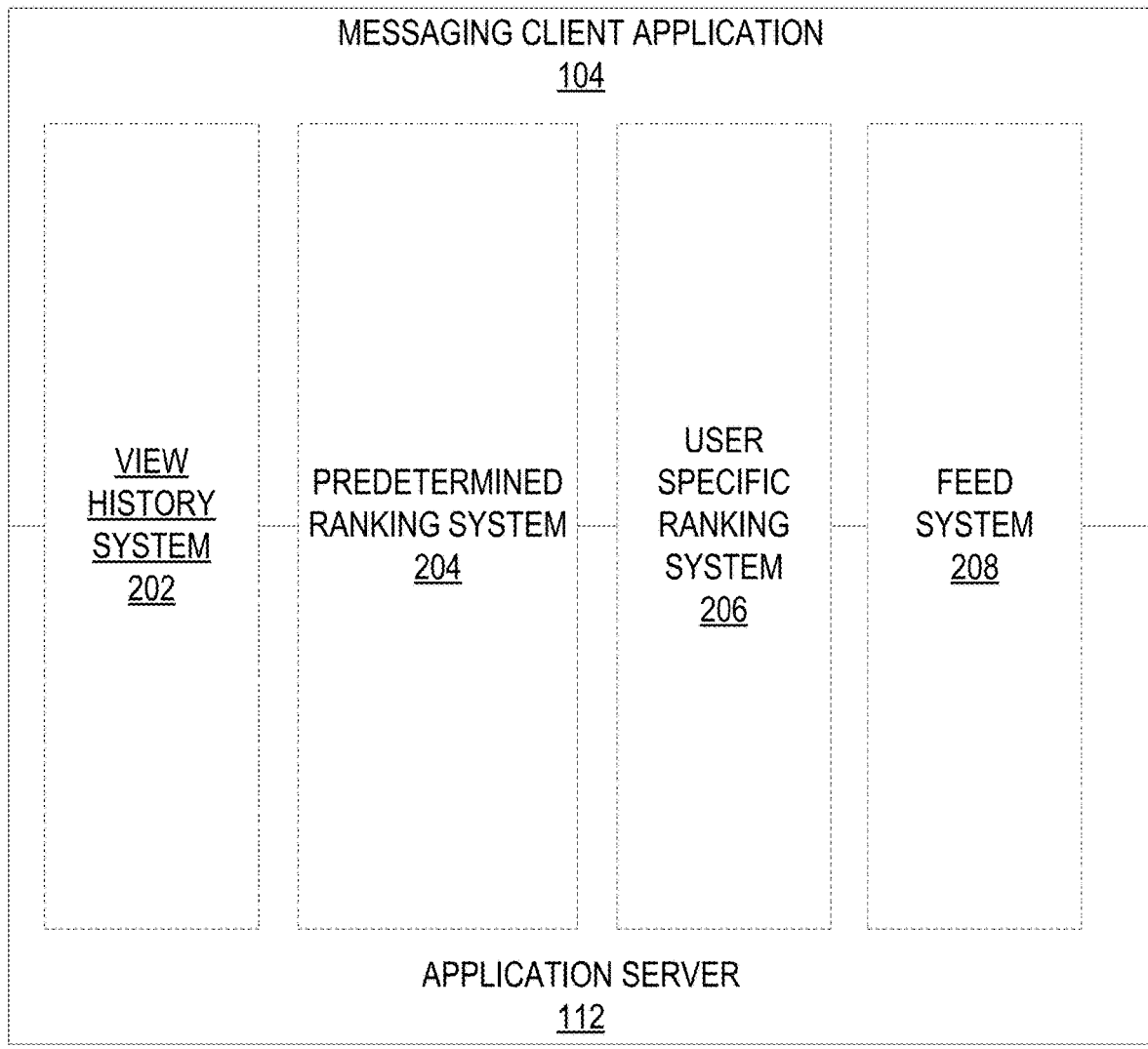
FIG. 2 is block diagram illustrating further details regarding the messaging system, according to some embodiments.

FIG. 2 is block diagram illustrating further details regarding the messaging system 100, according to exemplary embodiments. Specifically, the messaging system 100 is shown to comprise the messaging client application 104 and the application server 112, which in turn embody a number of subsystems, namely a view history system 202, a predetermined ranking system 204, a user specific real time ranking system 206, and a feed system 208.

The view history system 202 maintains a history of user viewing activity. This may include providing a database that stores records of view activity by a plurality of users of the social network system 116. The view history system 202 may also generate metrics to characterize behavior of users of the social network system 116. For example, the view history system may generate affinity scores for a plurality of categories of content for each user. The affinity scores may represent to what extent each respective user prefers content of the respective category. The affinity scores may be used to generate rankings of content for users, as described in more detail below.

The predetermined ranking system 204 generates rankings for use in displaying content to users. The predetermined ranking system 204 may operate asynchronously, or independently, of any particular viewing activity of any particular user. In other words, viewing activity may be recorded by the view history system. Periodically, or at various time intervals, the predetermined ranking system may generate a set of rankings of content. Each ranking in the set may be associated with a particular value set. The value sets characterize preferences of a group or cluster of users. Because these predetermined rankings are generated before a request for content is received from a user, latency from a first time a user requests content until a second time when the content is provided to the user is reduced, relative to a system that would determine the ranking after the user request is generated or received.

The user specific ranking system 206 generates a second ranking that is based only on content viewing activity of a particular user. When the particular user requests content to be viewed, the user specific ranking system 206 generates a ranking, which is then integrated with another ranking previously generated by the predetermined ranking system 204.

The feed system 208 provides a display of content defined by the integrated ranking generated based on a first ranking from the predetermined ranking system and a second ranking from the user specific ranking system.

Figure 3:
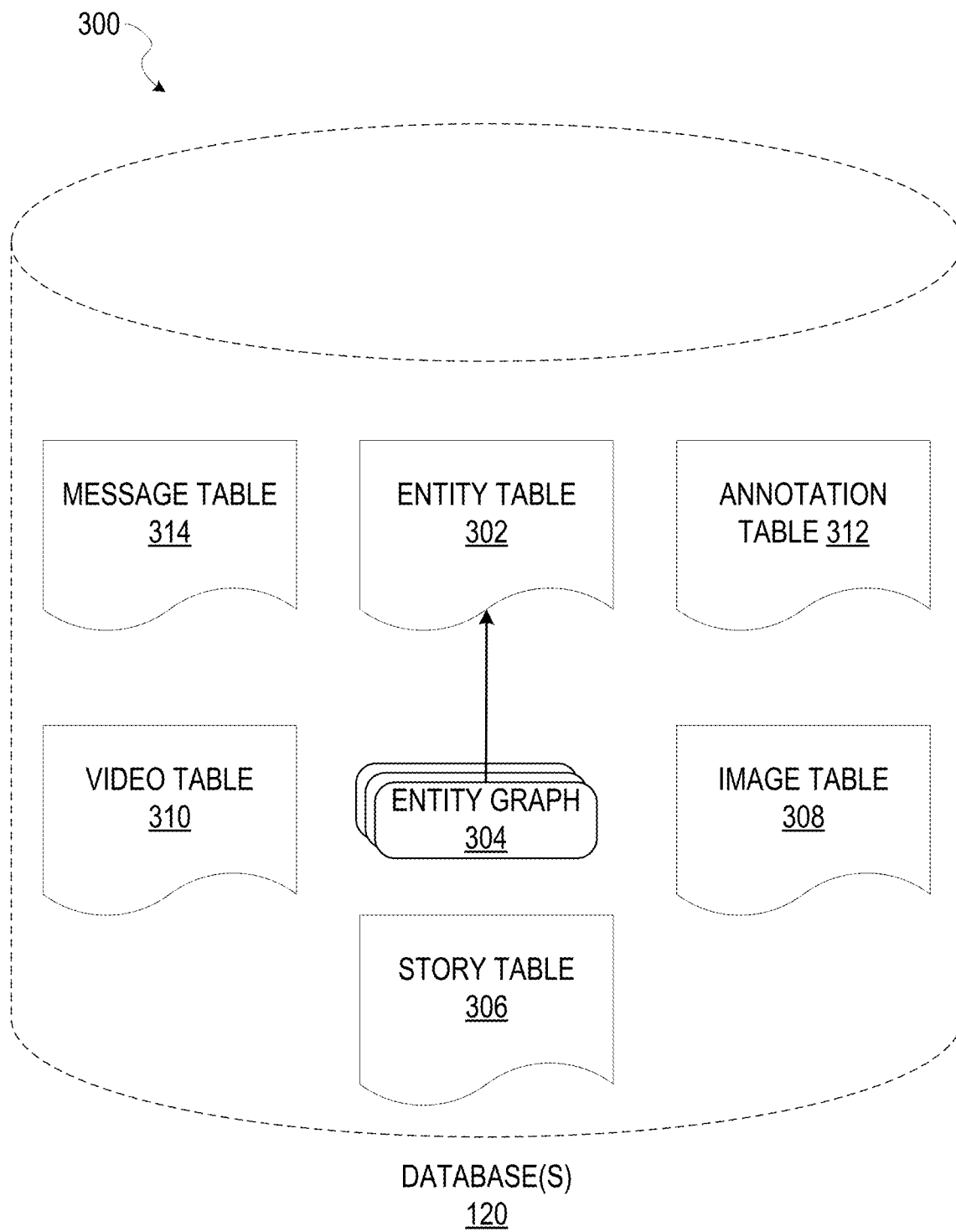
FIG. 3 is a schematic diagram illustrating data which may be stored in a database of the messaging system, according to some embodiments.

FIG. 3 is a schematic diagram 300 illustrating data which may be stored in the database 120 of the messaging server system 108, according to certain exemplary embodiments. While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interested-based, or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a Story or a gallery). The creation of a particular collection may be initiated by a particular user (e.g., a user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and who are at a common location or event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
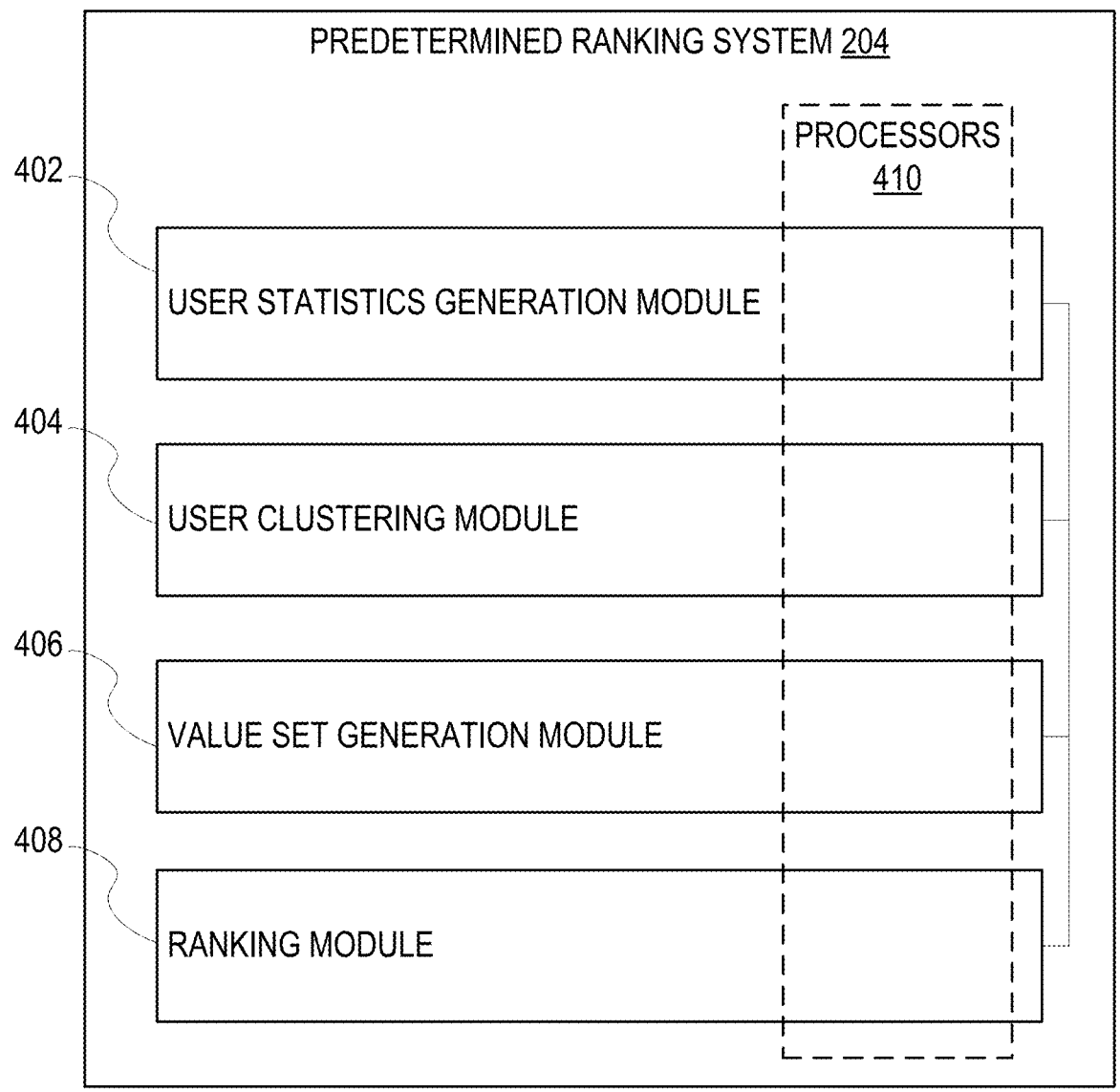
FIG. 4 is a block diagram illustrating functional components of a feed display system that forms part of the messaging system, according to some example embodiments.

FIG. 4 is a block diagram illustrating functional components of the predetermined ranking system 204 that forms part of the messaging system 100, according to some example embodiments. To avoid obscuring the inventive subject matter with unnecessary detail, various functional components (e.g., modules, engines, and databases) that are not germane to conveying an understanding of the inventive subject matter have been omitted from FIG. 4. However, a skilled artisan will readily recognize that various additional functional components may be supported by the predetermined ranking system 204 to facilitate additional functionality that is not specifically described herein. As shown, the predetermined ranking system 204 includes a user statistics generation module 402, user clustering module 404, value set generation module 406, and a ranking module 408.

The above referenced functional components of the predetermined ranking system 204 are configured to communicate with each other (e.g., via a bus, shared memory, a switch, or APIs). Collectively, these components facilitate presenting of a feed of information content to a social network user based on content of the social network. In other words, the user statistics generation module 402, user clustering module 404, value set generation module 406, and ranking module 408, work in conjunction to provide a prioritized display of content for the user.

The user statistics generation module 402 generates statistics that represent content viewing preferences for a plurality of users of the social network system 116. The user clustering module 404 clusters the users into a plurality of clusters. Users in each of the plurality of clusters demonstrate some similarities between their respective metrics as generated by the user statistics generation module 402. The value set generation module 406 generates a plurality of value sets, at least one value set for each cluster generated by the user clustering module 404. The ranking module 404 generates rankings based on the value sets generated by the value set generation module 406. The rankings are then available when a user requests content. The user is matched with a value set, and the associated ranking is used to deliver content to the user.

As is understood by skilled artisans in the relevant computer and Internet-related arts, each functional component illustrated in FIG. 4 may be implemented using hardware (e.g., a processor of a machine) or a combination of logic (e.g., executable software instructions) and hardware (e.g., memory and the processor of a machine) for executing the logic. For example, any component included as part of the predetermined ranking system 204 may physically include an arrangement of one or more processors 410 (e.g., a subset of or among one or more processors of a machine) configured to perform the operations described herein for that component. As another example, any component of the predetermined ranking system 204 may include software, hardware, or both, that configure an arrangement of the one or more processors 410 to perform the operations described herein for that component. Accordingly, different components of the predetermined ranking system 204 may include and configure different arrangements of such processors 410 or a single arrangement of such processors 410 at different points in time.

Furthermore, the various functional components depicted in FIG. 4 may reside on a single machine (e.g., a client device or a server) or may be distributed across several machines in various arrangements such as cloud-based architectures. Moreover, any two or more of these components may be combined into a single component, and the functions described herein for a single component may be subdivided among multiple components. Functional details of these components are described below with respect to FIGS. 5-13.

Figure 5:
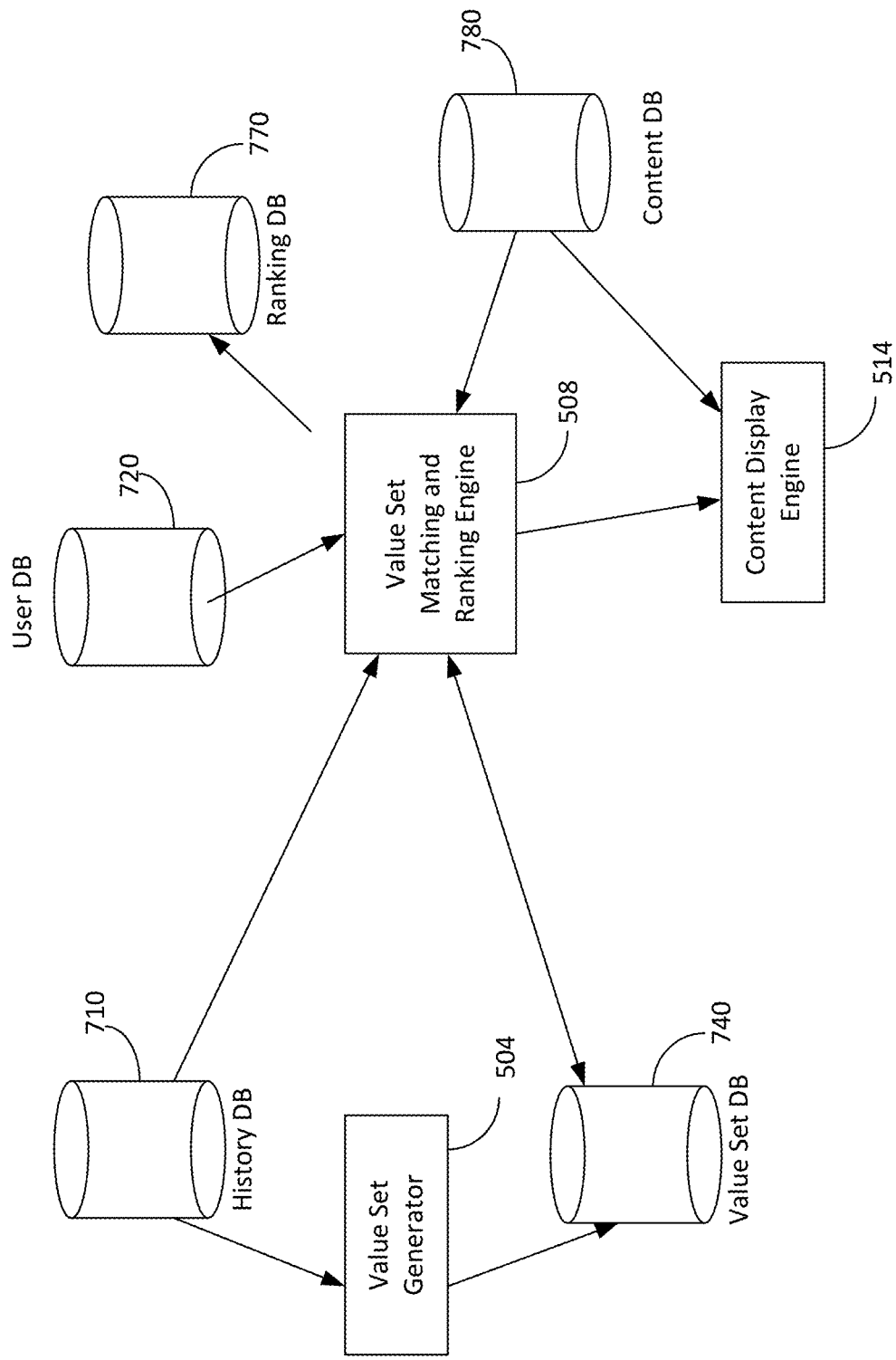
FIG. 5 is an overview diagram of a system for ranking feeds.

FIG. 5 is an overview diagram of a system for ranking feeds. The system 500 includes a history database 710. The history database stores data indicating previous viewing histories of users of the system 500. A value set generator 504 generates a plurality of value sets stored in a value set database 740 based on the history database 710. A value set may be a collection of values for a plurality of characteristics. Characteristics may include demographic characteristics of a user, such as age, gender, place of residence, or other characteristics. Other types of characteristics may also be included in a value set. One or more scores relating to behavior of the user may form user characteristics. For example, a particular user's propensity to view sports stories may be represented via a characteristic.

The value set generator 504 may determine groups of value sets represented by the history database 710 and store the most popular value sets in the value set database 740. The value set generator 504 may also associate a content ranking with each of the value sets.

A combined value set matching and ranking engine 508 may determine rankings for a plurality of value sets stored in the value set database 740. To determine the rankings, the value set matching and ranking engine 508 may read data from the historical database 710, and content database to determine content most likely to be viewed by a user having characteristics of a particular value set. The ranking is then stored in the ranking database 770, and associated with the particular value set in the value set database.

The value set matching and ranking engine 508 may then find a best fit between a particular user's characteristics stored in the user database 720 and value sets in the value set database 740. Once a best fit match is identified, the ranking is used to obtain content from a content database 780 for display by a content display engine 514. Note that the value sets and associated rankings may be determined before a particular user logs in and begins viewing a display, for example, a feed, that displays content according to one of the rankings. In other words, in some aspects, the rankings may be established prior to a user requesting (explicitly or implicitly) content display. Thus, content may be displayed to the user quickly and efficiently, as the system does not need to compute a ranking for the user when the user requests content, which may be a relatively computationally intensive process in some embodiments. In some aspects, the rankings may be updated or recreated periodically, for example, every 30 minutes, one hour, or other time period.

Figure 6:
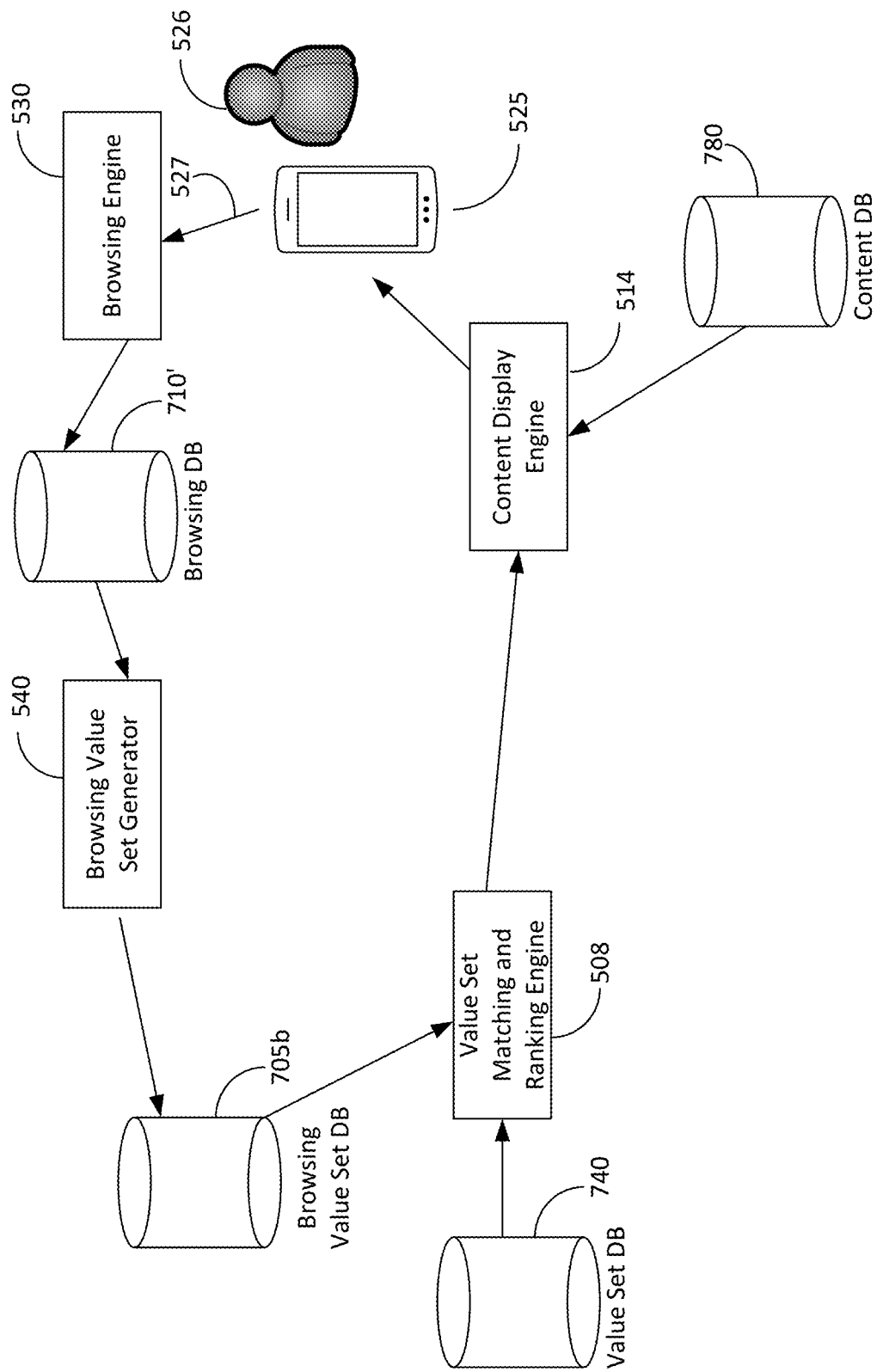
FIG. 6 shows another overview of a portion of a system for ranking feeds that may be implemented in at least some of the disclosed embodiments.

FIG. 6 shows another overview of a portion of a system for ranking feeds that may be implemented in at least some of the disclosed embodiments. FIG. 6 shows the value set database 740 and value set matching engine 508 of FIG. 5. FIG. 6 also shows the content display engine 514 and content database 780 of FIG. 7.

FIG. 6 also shows a smart phone 525. A user 526 may view content via the smart phone 1025. Requests to view content 527 are received by a browsing engine 530. The browsing engine 530 is configured to store content viewing activity of the user 526 in a browsing database 705b. A browsing value set generator reads the browsing database 710' and generates a browsing value set and stores it in the browsing value set database 705b for the user 526. The browsing value set 705b for the user 526 represents values of characteristics that represent recent browsing activity of the user. In some aspects, the browsing value set 705b may be continuously regenerated in real time. For example, the browsing value set generator 540 may be configured to regenerate a browsing value set 705b for the user 526 after each request to view content is received from the user 526 (or the smart phone 525).

FIG. 6 shows the value set matching engine 508 receiving a value set from the value set database 740 and a browsing value set 705b from the browsing value set database 710'. The value set received from the value set database 740 may not be specific to browsing activity of only the user 526. Instead, the value set from the value set database 740 may be determined based on aggregating browsing activity from the history database 710 discussed above with respect to FIG. 5. In contrast, the browsing value set 705b retrieved from the browsing set database 710' is generated specifically based on historical browsing data for the particular user 526. The value set matching engine integrates data from these two value sets to generate a ranking for displaying content to the user 526. While the value set retrieved from the value set database 740 may be generated offline, or prior to particular browsing activity of the user 526, the browsing value set from the browsing value set database 705a In the description above of FIGS. 5 and 6, each of the components described above such as the value set generator 504, the value set matching engine and ranking engine 508, content display engine 514, browsing engine 530, and browsing value set generator 540 may represent instructions stored in a memory, with the instructions arrange to configure hardware processing circuitry to perform one or more functions attributed to each of the respective components.

Figure 7A:
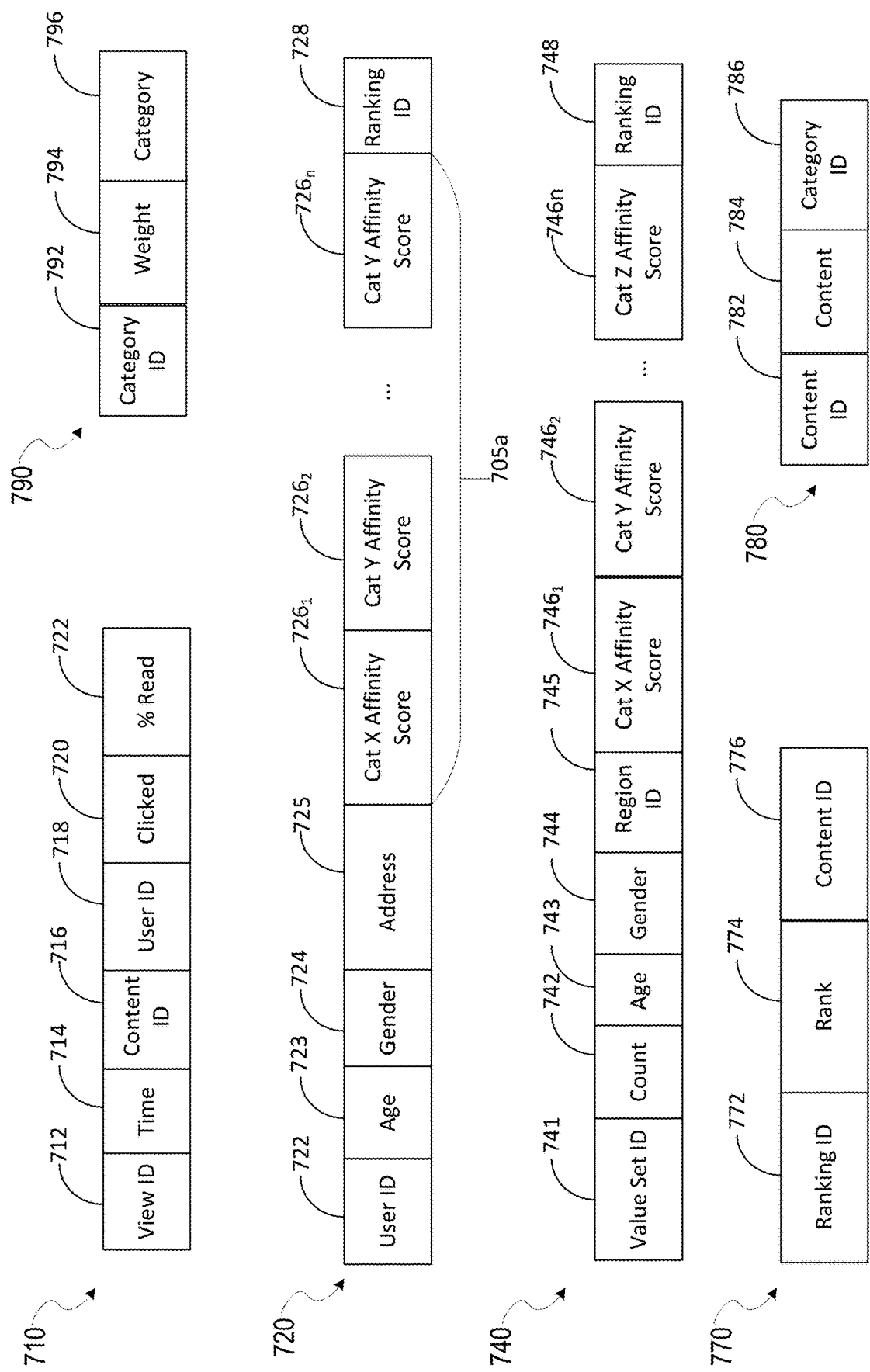
FIG. 7A shows examples of data structures that may be implemented in at least one of the disclosed embodiments.

FIG. 7A shows examples of data structures that may be implemented in at least one of the disclosed embodiments. FIG. 7A shows a view history database 710, user database 720, value set database 740, a ranking database 770, and a content database 780. While the data structures discussed below with respect to FIG. 7A are described as relational database tables, one of skill would understand that in various embodiments, a variety of data storage organizations could be used to implement one or more of the fields discussed below with respect to FIG. 7A. For example, in some other embodiments, the fields discussed below could be implemented as part of traditional in memory data structures such as linked lists, trees, queues, structs, records, or other structures.

The view history database 710 includes a view identifier 712, time 714, content identifier 716, a user identifier 718, an indication of whether the user clicked on the content 720, and an indication of what percent of the content was viewed by the user 722. The view identifier 712 uniquely identifies a particular view event. The time field 714 indicate a time the content was viewed. The content identifier 716 identifies which particular content was viewed, and the user id 718 identifies a particular user that initiated the view event.

The user database 720 includes a user identifier 722, age 723, gender 724, address 725, an affinity score for a first category of content $726_1$, an affinity score for a second category of content $726_2$, and a ranking identifier 748. A browsing value set 705a may be comprised of one or more fields of the user database 720. The browsing value set 705a indicates particular characteristics of browsing activity of a user identified by the user id 720. This browsing value set 705a may be updated continuously as a user views content, as disused above. While the browsing value set 705a is shown to include only two fields in FIG. 7A, one of skill would understand that any number of characteristics could be included in the browsing value set 705a.

The affinity scores $726_{1 \ldots n}$ indicate a likelihood that the user identified by the user id 722 will view content of the given category. In some aspects, an affinity score for a particular user and a particular category is based on a percentage of the particular user's views that are of content classified as the particular category. The ranking identifier 748 may identify a ranking of content that is generated based on the browsing value set 705a.

The value set database 740 includes a value set id 741, a count 742, age 743, gender 744, region identifier 745, an affinity score or affinity score range for the first category of content $746_1$, an affinity score or affinity score range for a second category of content $746_2$, up to an additional category of content $746n$. Various embodiments may implement any number of different categories of content, and may therefore maintain affinity scores for each of those different categories of content. The value set database 740 also includes a ranking identifier 748. The value set identifier 741 uniquely identifies a particular value set. A value set is a unique combination of values or range of values for a plurality of characteristics. Example characteristics are shown as fields of the value set database 740, including fields $743\text{-}746_{1 \ldots n}$, but embodiments disclosed are not limited to the example fields shown.

The count field 742 is an indication of the number of views stored in the view history database 710 that the particular value set identified by the value set identifier 741 represents. In some aspects, the count stored in the count field 742 may be normalized. As discussed above, a value set generator 704 may identify clusters or groups of combination of characteristics that have similar content preferences. These may be identified as value sets in the value set database. As users matching a particular value set have similar preferences for content, a ranking is associated with each value set via ranking identifier 748. The ranking may be used to provide ranked content to users matching the particular value set when those users request content to view.

The ranking database 770 stores a ranking identifier 772, rank 774, and content identifier 776. The ranking identifier 772 uniquely identifies a ranking of content. In a relational data organization as shown in FIG. 7A, there may be multiple entries for a single ranking identifier 772, with the rank field 774 defining an order of the entries. The content identifier 776 identifies content associated with the particular ranking and ranked at the position indicated by the rank field 774.

The content database 780 includes a content identifier 782, content 784, and a category identifier 786. The content identifier 782 uniquely identifies the content stored in the content field 784. The category id uniquely identifies a category for the content stored in the content field 784. In some aspects, there may be multiple content id fields 786 (not shown), as content may be categorized in multiple categories in some embodiments.

A category database 790 includes a category identifier 792, weight 794 and category name 796. The category identifier 792 uniquely identifies a content category and may be cross referenced with the category identifier 786. Weight value 794 may be used in some embodiments to weight a category of content when determining a ranking for displaying content based on a value set, which is discussed in more detail below.

Figure 7B:
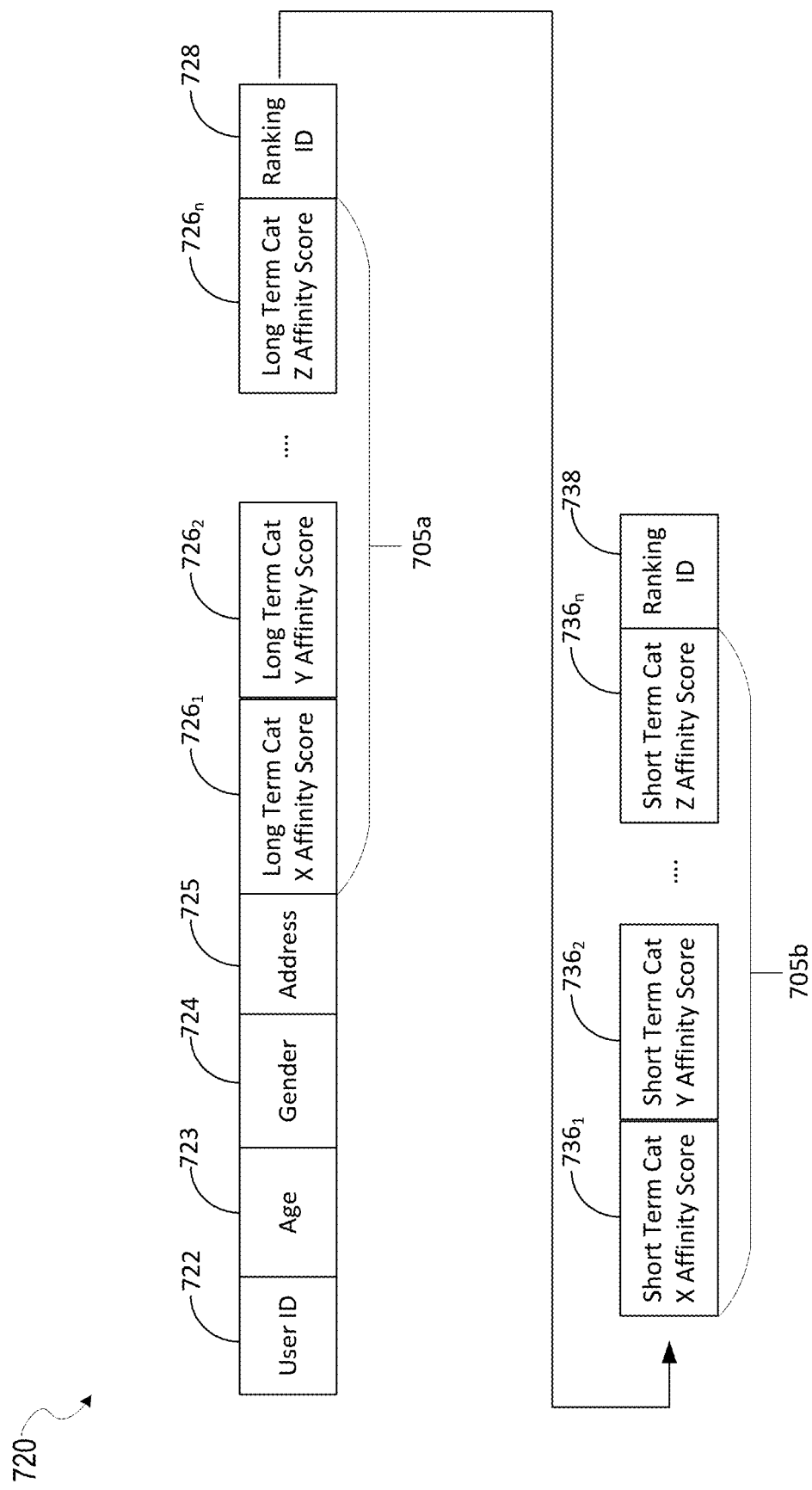
FIG. 7B shows an alternate embodiment of the user table 720.

FIG. 7B shows an alternate embodiment of the user table 720. The user table 720 of FIG. 7B is similar to the user table 720a of FIG. 7A, except that user table 720b includes long term characteristics, such as long term category affinity scores $726_{1...n}$, and short term category affinity scores $736_{1...n}$. User table 720b also includes a second ranking identifier 738, which may identify a ranking based on the short term category affinity scores $736_{1...n}$. The long term category affinity scores may be determined periodically, for example, disconnected from user activity, such that a ranking, identified by ranking id 728, is already created and ready for reference when a user requests content to view. In contrast, a second ranking, identified by ranking id 738, may be generated as the user requests content to view, and may reflect up to date user preferences for content during a relatively shorter time period than that provided by the first ranking (e.g., id 728). The time period for content views considered by the second ranking (e.g. id 738) is shorter than the time period for content views considered by the first ranking (e.g. id 728).

Figure 8:
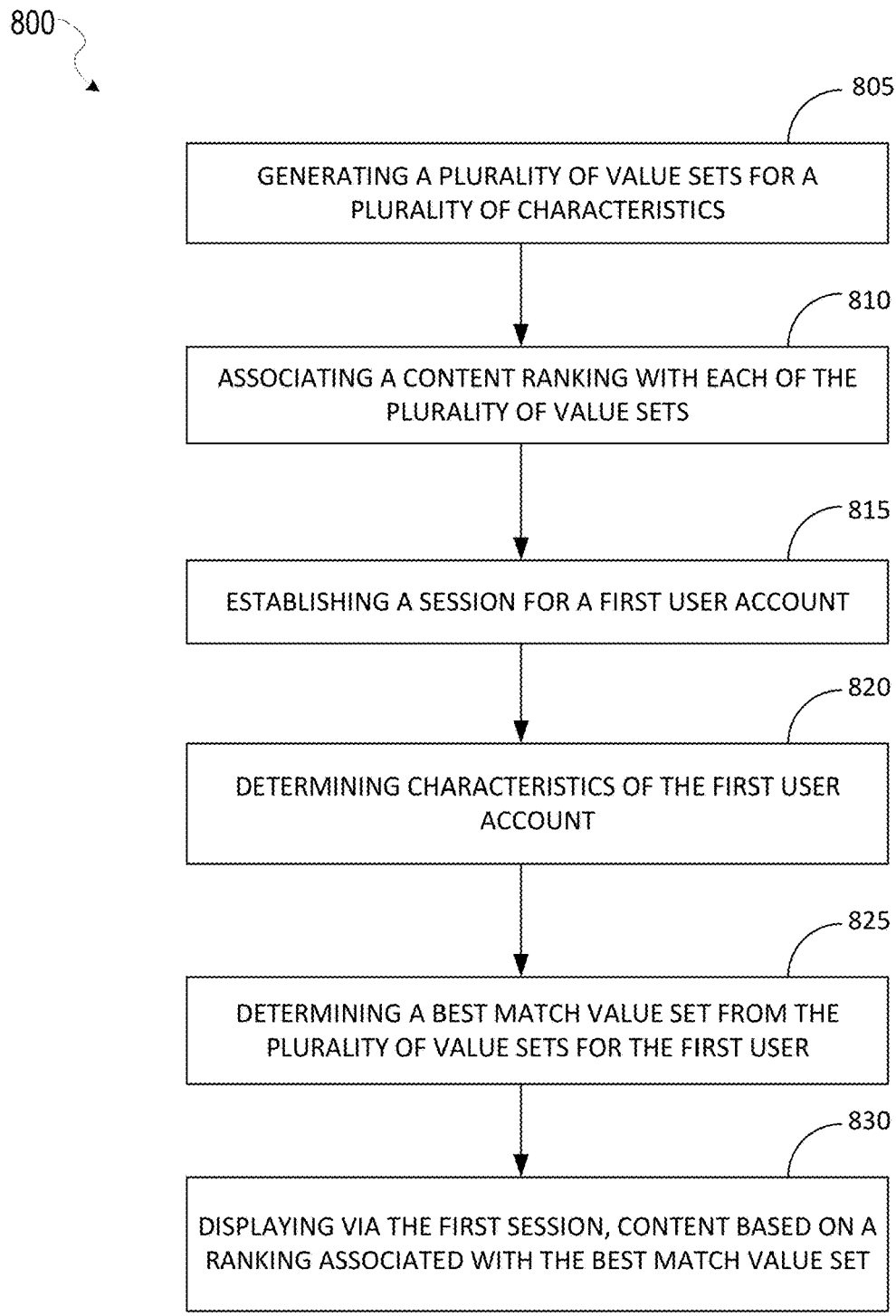
FIG. 8 is a flowchart for ranking a content feed.

FIG. 8 is a flowchart for ranking a content feed. In some aspects, one or more of the functions discussed below with respect to process 800 may be performed by hardware processing circuitry. For example, instructions stored in an electronic hardware memory may configure the hardware processing circuitry to perform one or more of the functions discussed below with respect to FIG. 8.

In operation 805, a plurality of value sets are generated for a plurality of characteristics. The characteristics may be characteristics associated with users. For example, as discussed above with respect to FIGS. 7A-B, the characteristics may include any of the data identified via fields $723\text{-}726_{1...n}$, or but are not limited to these. The characteristics may be grouped based on commonality, and ranked based on how frequently the groupings of characteristics are shared by one or more users. For example, in various embodiments, K-means clustering, Expectation Maximization Clustering, or Affinity propagation of data in the history database 710 and user table 720 be used. As one example, multiple users having similar affinity scores for category x (e.g. $726_1$) and category y (e.g. $726_2$) may result in generation of a value set that identifies affinity scores for category x and category y within a certain range to be criterion for matching those particular characteristics of the value set. The certain range may encompass the values for those multiple users within the fields $726_{1...n}$. Other users having dissimilar affinities to one or both of these affinity scores may cause generation of a second value set having different ranges for these same characteristics. These other users may be included in a different cluster than the multiple users discussed above in embodiments that use clustering methods. The fields $726_{1...n}$ are discussed above as illustrative examples. However, other embodiments may include multiple affinity scores beyond just $726_{1...n}$. For example, affinity scores may be generated for 5, 10, 15, 20, 50, 100, or 500 categories of content, or any number in between these examples.

In operation 810, a content ranking is associated with each of the plurality of value sets. As described above, the ranking engine 1020 may generate content rankings based on a history of previously viewed content, such as is available in the history database 710, and content that is available for viewing, which may be obtained from the content database 780. The ranking engine may read from the value set database a plurality of value sets that need an associated ranking. Based on particular values in each of the characteristics for each value set, the ranking engine may determine a ranked list of content from the content database for that particular value set, and associate the ranking with the value set (e.g. via 748). The details of the ranking are stored in the ranking database 770.

One example embodiment for generating a content ranking may select content by category in proportion to the affinity scores or ranges associated with each value set. For example, in a simplified example that includes, in a value set, affinity scores for categories X, Y, and Z, content from each of categories X, Y, and Z may be included in a ranking in proportion to the affinity scores. For example, if a ranking identifies an ordinal list of content, and X, Y, and Z scores are 10, 6, and 2, a first nine (9) stories in a ranking for the value set includes five stories from category X, three stories from category Y, and one story from category Z. How the nine stores are ordered may vary by embodiment. In some aspects, a first predetermined number of stories may each have a different category, with the categories of content ranked from highest affinity score to lowest affinity score within the predetermined number.

This example ranking may be modified in some embodiments by other factors. For example, each category may be associated with a weight, and the affinity score for a category is weighted and then stories are selected in response to the weighted affinity scores. Some embodiments may maintain a list of high priority stories that are randomly or predictably injected within a first predetermined number of stories or content within a ranking. This injection may be regardless of any affinity scores within the ranking, or, in some aspects, high priority stories may be associated with weights, and the weights of the high priority stories are used to interweave the high priority stories within the weighted affinity scores of the value set.

In operation 815, a session for a first user account is established. For example, authentication credentials may be evaluated and determined to identify the first user account. The session may be associated with a user id, with the user identifier identifying a specific user account.

In operation 820, characteristics of the first user account are determined. For example, as described above with respect to the user database 720, characteristics may be associated with a user account or user identifier. For example, characteristics $722\text{-}726_{1...n}$ are associated with the user identifier 722 in the user database 720.

In operation 825, a best match value set from the plurality of value sets is determined for the first user. In other words, and for example, the characteristics associated with the user (e.g. characteristics associated with a particular user, such as any of characteristics $722\text{-}726_{1...n}$) may be compared to value sets included in the value set database 740. The best match may be based on a count of matching characteristics within each of the plurality of value sets in the value set database and the characteristics of the first value set (associated with the user). In some aspects, a value set with the highest count of matching characteristics with the user's characteristics is the best match. As discussed above, in some aspects, a value set may indicate a range of values for an affinity score for a particular category. In these aspects, if the user's corresponding affinity score (for the particular category) falls within the range, then this affinity score counts as a matching characteristic between the user and the value set.

In some aspects, a weight is associated with each characteristic, and a weighted sum of matching characteristics may be determined, and used to determine the best match.

In operation 830, content is displayed via the first session based on a ranking associated with the best match value set. For example, as discussed above, each value set in the value set database 740 has an associated ranking (e.g. 748). The ranking identifies an ordered list of content, which may be displayed in operation 830 according to the order. In some other aspects of operation 830, the content may not necessary be displayed, but may instead be output to another type of output device. For example, the content associated with the ranking may be stored, in ranked order, in a file, or written to a network connection.

Figure 9:
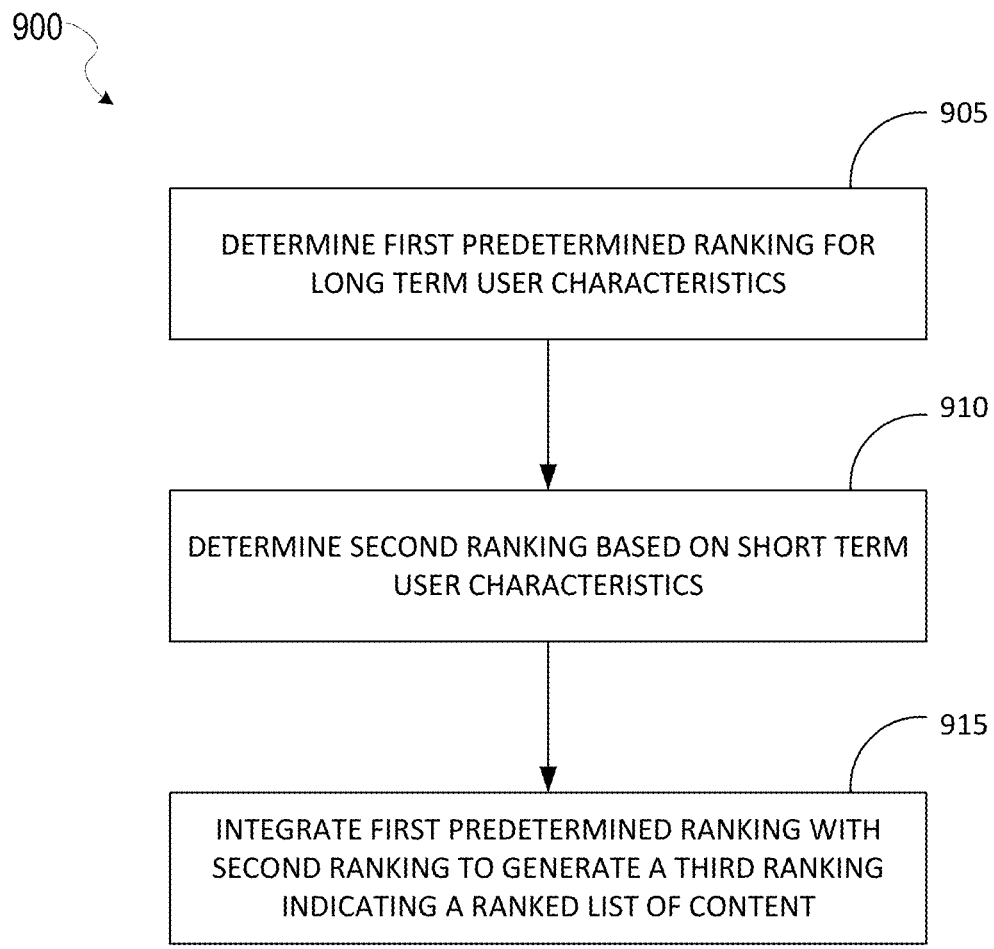
FIG. 9 is a flowchart of a method for integrating two rankings.

FIG. 9 is a flowchart of a method for integrating two rankings. In some aspects, one or more of the functions discussed below with respect to FIG. 9 may be performed by hardware processing circuitry. For example, instructions stored in an electronic hardware memory may configure the hardware processing circuitry to perform one more ore of the functions discussed below with respect to process 900 and/or FIG. 9.

As discussed above, some of the disclosed embodiments may generate two content rankings. A first ranking may be generated asynchronously to user activity. For example, as discussed above, rankings for value sets that represent clusters of user interest may be generated offline or periodically. This provides the advantage that when a user requests content, the ranking has already been generated and thus the content can be delivered to the user with lower latency. One disadvantage of a ranking that would be generated periodically and somewhat disconnected from current user browsing activity, is that it may not reflect current user interests. Thus, some of the disclosed embodiments blend the predetermined ranking of content with another second ranking. The second ranking may be determined in real time as the user requests content. In other words, recent content views by the user may shape the ranking such that the second ranking provides content of very current user interest. Since this second ranking may consider a much smaller set of content views that the first ranking, it can be generated more quickly and with less overhead than the first ranking. Thus, by providing two rankings, one generated periodically or asynchronously to user browsing activity, and a second ranking based on a smaller, more recent set of viewing activity, the user is able to obtain the best of both worlds, in that content present to them for viewing reflects both their long term strategic content interests, as well as their shorter term, more tactical interests reflected by very recent browsing activity. In some aspects, operation 830 of FIG. 8 may include one or more of the functions discussed below with respect to FIG. 9 and process 900.

In operation 905, a first predetermined ranking is determined based on long term user characteristics. The long term user characteristics may consider content viewing activity of a user over a longer, first time period. The longer, first time period may be, for example, at least one hour, at least four hours, at least 8 hours, at least 24 hours. As discussed above, the first predetermined ranking may be determined based on long term user characteristics, such as any of the user characteristics $726_1 \ldots 726_n$ discussed above with respect to FIG. 7B. Note that since the ranking of operation 905 is predetermined, some aspects of operation 905 determine the first predetermined ranking simply by consulting a database to obtain the ranking. For example, the ranking may be identified by finding a best match value set for a user as described above, and identifying the ranking already associated with the best match value set. No actual creation of the ranking is needed, as it has already been created. In some aspects, the first predetermined ranking may be created separately by process 1000, discussed below with respect to FIG. 10.

In operation 910, a second ranking is determined. The second ranking is based on a second set of user characteristics. The second set of user characteristics may be based on a different, shorter time period than the first time period (a second time period). The first and second time periods may overlap, at least partially. For example, content viewing activity included in the second time period may be partially included in the first time period. However, at least some content viewing activity included in the first time period is not included in the second time period. As discussed above, the second ranking may reflect very recent activity by the user. In some aspects, each content view by a user effects the second ranking, or at least is considered in the determination of the second ranking. In one embodiment, the second ranking is based on user characteristics $736_{1 \ldots n}$, discussed above with respect to FIG. 7B.

In operation 915, the first predetermined ranking of operation 905 and the second ranking of operation 910 are integrated to generate a third ranking, the third ranking indicating a list of ranked content. In some aspects, the integration may generate the list of ranked content to alternate content defined by the first predetermined ranking and content defined by the second ranking. In some aspects, content that overlaps between the first and second content will only occur in the third ranking once.

Figure 10:
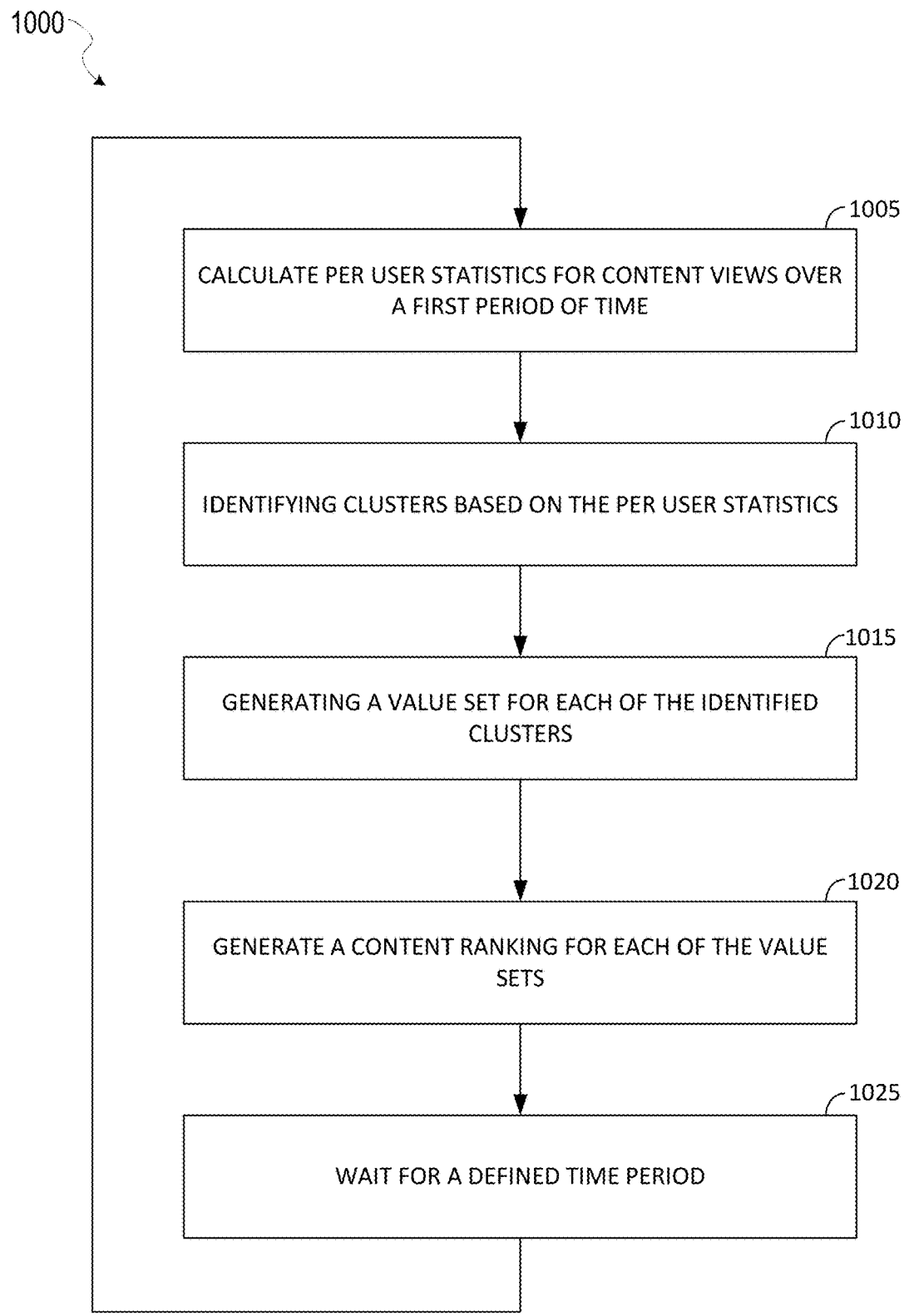
FIG. 10 is a flowchart of a method for generating a ranking of content for a plurality of value sets.

FIG. 10 is a flowchart of a method for generating a ranking of content for a plurality of value sets. In some aspects, one or more of the functions discussed below with respect to FIG. 10 may be performed by hardware processing circuitry. For example, instructions stored in an electronic hardware memory may configure the hardware processing circuitry to perform one more ore of the functions discussed below with respect to process 1000 and/or FIG. 10.

As discussed above, some of the disclosed embodiments may generate two rankings, with each ranking considering user content viewing activity over different time periods. A first ranking may consider a plurality of user content viewing activity, based on clusters of that activity. A user may then be shown content based on a ranking that fits best with their own viewing activity. Thus, there can be some degree of mismatch between the user's interest and the ranking provided via the first ranking. A second ranking is generated based on only activity of the particular user. The second ranking may be based on activity over a shorter time period than the first ranking. Process 1000 discussed below with respect to FIG. 10 generates the first ranking.

In operation 1005, per user statistics for content views are calculated over a first time period. Operation 1005 may include, for example, determining values for one or more of the fields within the value browsing set database 705a, discussed above with respect to FIG. 7A-B. For example, operation 1005, may, for a particular user, search the history database 710 for review records for the particular user (based on a matching user id 718). This search may be limited to records within a first time period. The various affinity scores within the browsing value set database 705a may then be calculated. This process may repeat for multiple users, for example, each user with login activity within a threshold period of time, or potentially all users of the social network system 116.

In operation 1010, clusters are identified based on the per user statistics for a plurality of users. For example, one or more clustering techniques may analyze the per user statistics calculated as part of operation 1005, along with other user characteristics, such as age (e.g. 723), gender (e.g. 724), or address (e.g. 725). The other user characteristics may not relate directly to content viewing activity of the user, as the browsing value set database values (e.g. $726_{1...n}$) do, but may be static user characteristics that do not change (at least frequently), such as demographic information. Thus, the result of operation 1010 is a plurality of clusters, which each cluster associated with multiple users of the social network system 116.

In operation 1015, a value set for each of the identified clusters is generated. For example, a value set may be generated to encompass a defined percentage of users who are included in a particular cluster. For example, if users within a cluster have an affinity to a particular category of content falling within a range of values, the value set may be generated to indicate that any affinity scores for the particular category of content within that range "match" that value set. A second range of the value set may be defined to encompass users within the cluster such that their affinity scores for a second category of content fall within the second range. To avoid causing outliers to skew the value set creation process, the ranges may be defined to encompass only a predefined percentage of users within the cluster (e.g. 90%, 95%, etc). In these embodiments some portion of users falling at either or both ends of the range may be excluded from "matching" the particular field or affinity score of the value set.

In operation 1020, a content ranking is generated for each of the value sets. A content ranking defines specific content and a display order for the specific content (e.g. via for example, ranking database 770, with ordinal rank field 774 and specific content identifier 776. Multiple "rows" in the ranking database 770 having the same ranking ID can define multiple content at different ranked positions within a single ranking. In some aspects, a ranking may be defined such that content within different categories is included in the ranking in proportion to corresponding affinity scores for the different categories of the value set (e.g. $746_{1...n}$, etc). An order of content within the ranking may be consist with an order of the affinity scores, in that a category of content with which the user has a highest affinity is presented within the ranking first, with progressively lower affinities following in affinity order. Other embodiments may order the content within the ranking using different methods.

Operation 1025 waits for a time period. The time period could be five minutes, 15 minutes, 60 minutes, 120 minutes, 24 hours, or any time period that is less frequent than the time period used to generate or determine the second ranking generated in process 900 (e.g. operation 910) above.

Process 1000 illustrates an embodiment that may periodically generate the content ranking of operation 1020. These content rankings may or may not be ever referenced. In some cases, after the ranking is generated, a user may request content, and then content is provided to the user based on the ranking, which preexists the content request. As discussed above, this approach provides for more responsive content display to a user, because the calculations necessary to computer user statistics, cluster the users, and generate value sets can be performed when the user is not necessary waiting for content to be displayed. Then later, when the user requests content, the ranking is waiting and ready to go.

Figure 11:
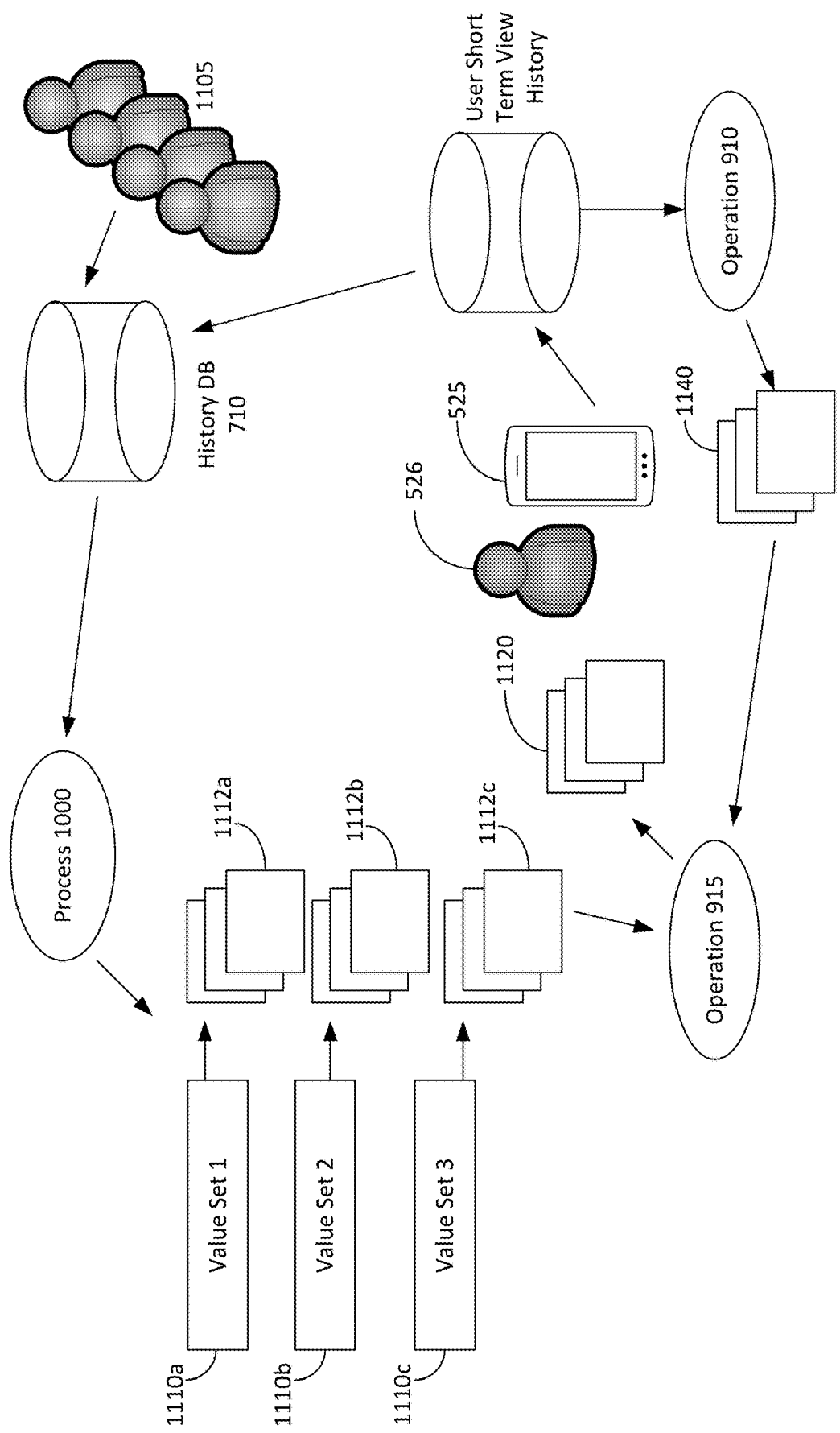
FIG. 11 shows another view of data flow in some of the disclosed embodiments.

FIG. 11 shows another view of data flow in some of the disclosed embodiments. FIG. 11 shows that process 1000, discussed above, may generate value sets 1110a-c, and corresponding rankings 1112a-c, based on the history database 710, which represents content viewing activity of a plurality of users 1105. An individual user 526, may view content on their smart phone 525. Note the individual user 526 may be included in the users 1105. Records representing short term viewing activity of the user 526 are stored in a user short term view history database, which may be part of the history database 710 in some aspects. For example, records in the history database 710 may record a time a particular view occurred. The user short term view history may only include records generated by the user 526 before a particular time, and is a later time than any time limits on records read from the history database 710 by process 1000.

As discussed above, operation 910 of process 900, discussed with respect to FIG. 9, generates a second ranking 1140 based on the user's short term viewing activity. Note the rankings 1112a-c are generated based on a plurality of user's content viewing activity, as represented by the history database 710, the second ranking 1140 is generated based on only the user's 526 content viewing history. Additionally, the timeframe of viewing activity considered when generating the ranking 1140, is shorter than the timeframe of viewing activity considered by process 1000 when generating the value sets and rankings 1112a-c.

Operation 915 then integrates one of the rankings 1112a-c and the ranking 1140 to generate an integrated content ranking 1120. Content is then displayed to the user according to the integrated content ranking 1120.

Software Architecture

Figure 12:
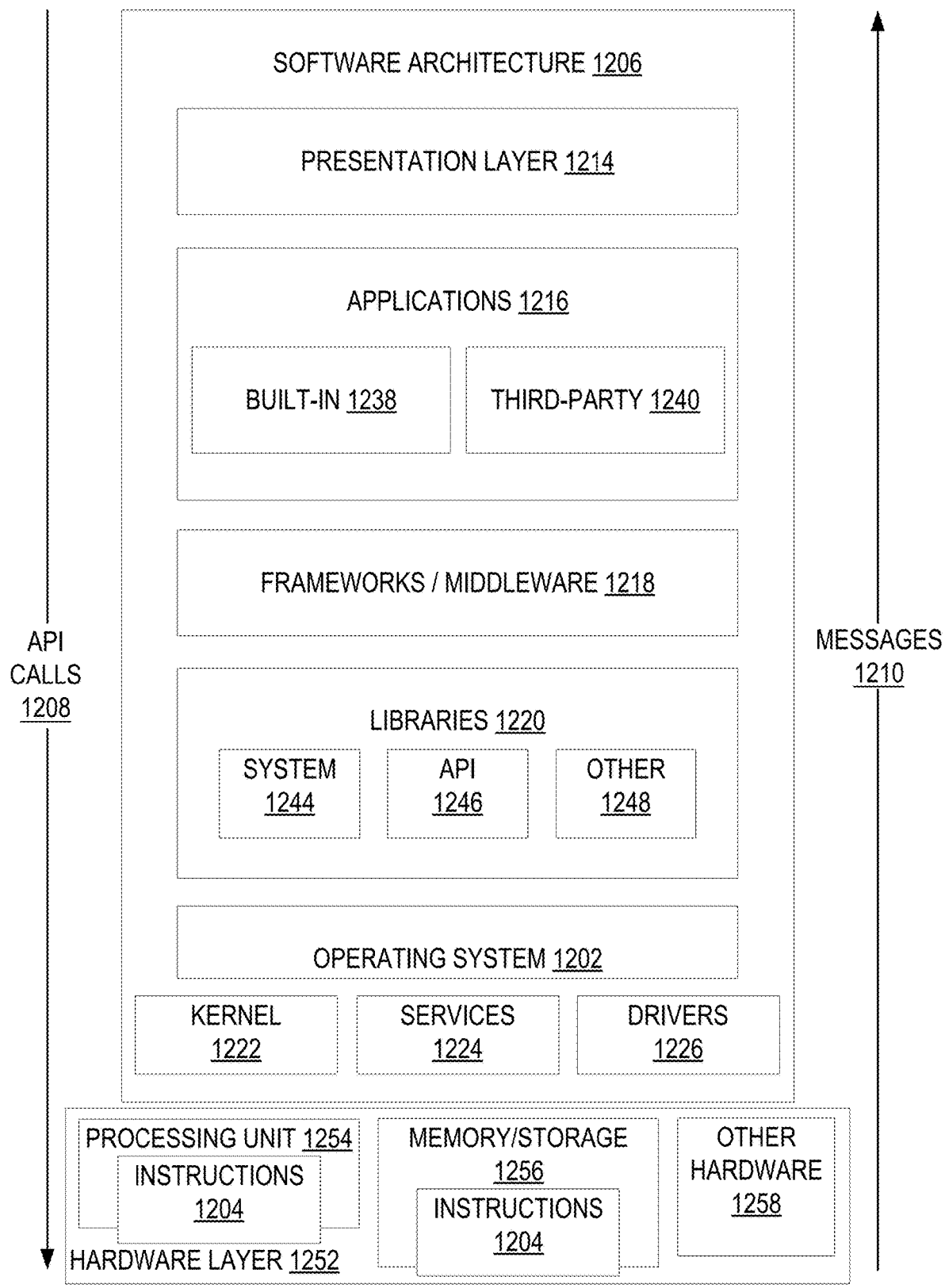
FIG. 12 is a block diagram illustrating a representative software architecture, which may be used in conjunction with various hardware architectures herein described.

FIG. 12 is a block diagram illustrating an example software architecture 1206, which may be used in conjunction with various hardware architectures herein described. FIG. 12 is a non-limiting example of a software architecture and it will be appreciated that many other architectures may be implemented to facilitate the functionality described herein. The software architecture 1206 may execute on hardware such as a machine 1300 of FIG. 13 that includes, among other things, processors 1304, memory/storage 1306, and I/O components 1318. A representative hardware layer 1252 is illustrated and can represent, for example, the machine 1300 of FIG. 13. The representative hardware layer 1252 includes a processing unit 1254 having associated executable instructions 1204. The executable instructions 1204 represent the executable instructions of the software architecture 1206, including implementation of the methods, components, and so forth described herein. The hardware layer 1252 also includes memory and/or storage 1256, which also have the executable instructions 1204. The hardware layer 1252 may also comprise other hardware 1258.

As used herein, the term "component" may refer to a device, a physical entity, or logic having boundaries defined by function or subroutine calls, branch points, APIs, and/or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application-Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

A processor may be, or include, any circuit or virtual circuit (a physical circuit emulated by logic executing on an actual processor) that manipulates data values according to control signals (e.g., "commands," "op codes," "machine code," etc.) and that produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 12, the software architecture 1206 may be conceptualized as a stack of layers where each layer provides particular functionality. For example, the software architecture 1206 may include layers such as an operating system 1202, libraries 1220, frameworks/middleware 1218, applications 1216, and a presentation layer 1214. Operationally, the applications 1216 and/or other components within the layers may invoke API calls 1208 through the software stack and receive a response as messages 1210. The layers illustrated are representative in nature and not all software architectures have all layers. For example, some mobile or special-purpose operating systems may not provide a frameworks/middleware 1218 layer, while others may provide such a layer. Other software architectures may include additional or different layers.

The operating system 1202 may manage hardware resources and provide common services. The operating system 1202 may include, for example, a kernel 1222, services 1224, and drivers 1226. The kernel 1222 may act as an abstraction layer between the hardware and the other software layers. For example, the kernel 1222 may be responsible for memory management, processor management (e.g., scheduling), component management, networking, security settings, and so on. The services 1224 may provide other common services for the other software layers. The drivers 1226 are responsible for controlling or interfacing with the underlying hardware. For instance, the drivers 1226 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1220 provide a common infrastructure that is used by the applications 1216 and/or other components and/or layers. The libraries 1220 provide functionality that allows other software components to perform tasks in an easier fashion than by interfacing directly with the underlying operating system 1202 functionality (e.g., kernel 1222, services 1224, and/or drivers 1226). The libraries 1220 may include system libraries 1244 (e.g., C standard library) that may provide functions such as memory allocation functions, string manipulation functions, mathematical functions, and the like. In addition, the libraries 1220 may include API libraries 1246 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1220 may also include a wide variety of other libraries 1248 to provide many other APIs to the applications 1216 and other software components/modules.

The frameworks/middleware 1218 provide a higher-level common infrastructure that may be used by the applications 1216 and/or other software components/modules. For example, the frameworks/middleware 1218 may provide various graphic user interface (GUI) functions, high-level resource management, high-level location services, and so forth. The frameworks/middleware 1218 may provide a broad spectrum of other APIs that may be utilized by the applications 1216 and/or other software components/modules, some of which may be specific to a particular operating system 1202 or platform.

The applications 1216 include built-in applications 1238 and/or third-party applications 1240. Examples of representative built-in applications 1238 may include, but are not limited to, a contacts application, a browser application, a book reader application, a location application, a media application, a messaging application, and/or a game application. The third-party applications 1240 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1240 may invoke the API calls 1208 provided by the mobile operating system (such as the operating system 1202) to facilitate functionality described herein.

The applications 1216 may use built-in operating system functions (e.g., kernel 1222, services 1224, and/or drivers 1226), libraries 1220, and frameworks/middleware 1218 to create user interfaces to interact with users of the system. Alternatively, or additionally, in some systems interactions with a user may occur through a presentation layer, such as the presentation layer 1214. In these systems, the application/component "logic" can be separated from the aspects of the application/component that interact with a user.

Exemplary Machine

Figure 13:
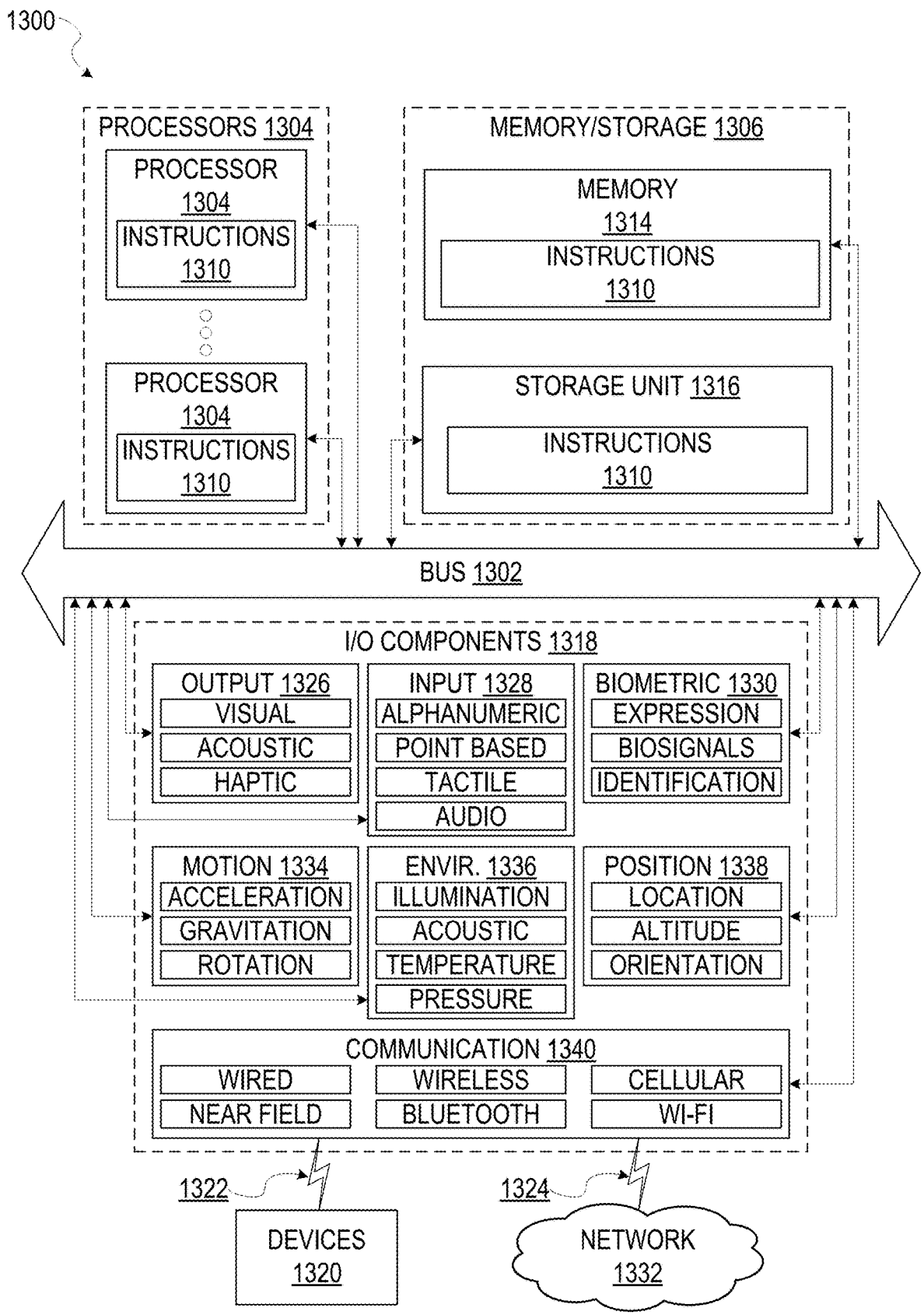
FIG. 13 is a block diagram illustrating components of a machine, according to some exemplary embodiments, able to read instructions from a machine-readable medium (e.g., a machine-readable storage medium) and perform any one or more of the methodologies discussed herein.

FIG. 13 is a block diagram illustrating components (also referred to herein as "modules") of a machine 1300, according to some exemplary embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1310 (e.g., software, a program, an application, an applet, an app, or other executable code) for causing the machine 1300 to perform any one or more of the methodologies discussed herein may be executed. As such, the instructions 1310 may be used to implement modules or components described herein. The instructions 1310 transform the general, non-programmed machine 1300 into a particular machine 1300 programmed to carry out the described and illustrated functions in the manner described. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1310, sequentially or otherwise, that specify actions to be taken by machine 1300. Further, while only a single machine 1300 is illustrated, the term "machine" shall also be taken to include a collection of machines that individually or jointly execute the instructions 1310 to perform any one or more of the methodologies discussed herein.

The machine 1300 may include processors 1304, memory/storage 1306, and I/O components 1318, which may be configured to communicate with each other such as via a bus 1302. The memory/storage 1306 may include a memory 1314, such as a main memory, or other memory storage, and a storage unit 1316, both accessible to the processors 1304 such as via the bus 1302. The storage unit 1316 and memory 1314 store the instructions 1310 embodying any one or more of the methodologies or functions described herein. The instructions 1310 may also reside, completely or partially, within the memory 1314, within the storage unit 1316, within at least one of the processors 1304

(e.g., within the processor's cache memory), or any suitable combination thereof, during execution thereof by the machine 1300. Accordingly, the memory 1314, the storage unit 1316, and the memory of the processors 1304 are examples of machine-readable media.

As used herein, the term "machine-readable medium," "computer-readable medium," or the like may refer to any component, device, or other tangible medium able to store instructions and data temporarily or permanently. Examples of such media may include, but are not limited to, random-access memory (RAM), read-only memory (ROM), buffer memory, flash memory, optical media, magnetic media, cache memory, other types of storage (e.g., Electrically Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes signals per se.

The I/O components 1318 may include a wide variety of components to provide a user interface for receiving input, providing output, producing output, transmitting information, exchanging information, capturing measurements, and so on. The specific I/O components 1318 that are included in the user interface of a particular machine 1300 will depend on the type of machine. For example, portable machines such as mobile phones will likely include a touch input device or other such input mechanisms, while a headless server machine will likely not include such a touch input device. It will be appreciated that the I/O components 1318 may include many other components that are not shown in FIG. 13. The I/O components 1318 are grouped according to functionality merely for simplifying the following discussion and the grouping is in no way limiting. In various exemplary embodiments, the I/O components 1318 may include output components 1326 and input components 1328. The output components 1326 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1328 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like. The input components 1328 may also include one or more image-capturing devices, such as a digital camera for generating digital images and/or video.

In further exemplary embodiments, the I/O components 1318 may include biometric components 1330, motion components 1334, environment components 1336, or position components 1338, as well as a wide array of other components. For example, the biometric components 1330 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1334 may include acceleration sensor components (e.g., accelerometer), gravitation sensor components, rotation sensor components (e.g., gyroscope), and so forth. The environment components 1336 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1338 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1318 may include communication components 1340 operable to couple the machine 1300 to a network 1332 or devices 1320 via a coupling 1324 and a coupling 1322 respectively. For example, the communication components 1340 may include a network interface component or other suitable device to interface with the network 1332. In further examples, the communication components 1340 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1320 may be another machine or any of a wide variety of peripheral devices (e.g., a peripheral device coupled via a USB).

Moreover, the communication components 1340 may detect identifiers or include components operable to detect identifiers. For example, the communication components 1340 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF4111, Ultra Code, UCC RSS-2D bar code, and other optical codes), or acoustic detection components (e.g., microphones to identify tagged audio signals). In addition, a variety of information may be derived via the communication components 1340, such as location via Internet Protocol (IP) geolocation, location via Wi-Fi® signal triangulation, location via detecting an NFC beacon signal that may indicate a particular location, and so forth.

Where a phrase similar to "at least one of A, B, or C," "at least one of A, B, and C," "one or more of A, B, or C," or "one or more of A, B, and C" is used, it is intended that the phrase be interpreted to mean that A alone may be present in an embodiment, B alone may be present in an embodiment, C alone may be present in an embodiment, or any combination of the elements A, B, and C may be present in a single embodiment; for example, A and B, A and C, B and C, or A and B and C may be present.

Changes and modifications may be made to the disclosed embodiments without departing from the scope of the present disclosure. These and other changes or modifications are intended to be included within the scope of the present disclosure, as expressed in the following claims.

We claim:

1. A system comprising:
    hardware processing circuitry; and
    a hardware memory storing instructions that when executed configure the hardware processing circuitry to perform operations comprising:
    detecting that an account is logging in to an application that was previously installed on a user device associated with the account to establish a session; and
    in response to the detecting:
        determining a first ranking of content based on a cluster of user interest during disconnected activity of the account;
        identifying content viewing activity of the account in the application subsequent to the account logging into the application, the content viewing activity initiated by the account on the user device;
        determining a second ranking of the content based on the content viewing activity;
        determining a blended ranking of the content based on the first ranking for the cluster of user interest during the disconnected activity and the second ranking associated with the content viewing activity subsequent to the account logging into the application, the blended ranking reflecting both user activity during the disconnected activity and subsequent to the account logging into the application; and
        generating for display, via the established session, the content based on the blended ranking.

2. The system of claim 1, wherein the operations further comprise: storing a user specific database for the account, the user specific database separately maintaining a set of long term affinity scores for a plurality of categories of content and a set of short term affinity scores for the plurality of categories of content, the set of long term affinity scores being determined based on disconnected activity of the account and representing characteristics of a plurality of user accounts, the set of short term affinity scores being determined based content viewing activity performed by the account during an established session.

3. The system of claim 2, the operations further comprising:
    selecting a plurality of content items based on categories of the plurality of content items to determine the first ranking in proportion to the set of long term affinity scores or the set of short term affinity scores.

4. The system of claim 3, the operations further comprising:
    determining that the set of long term affinity scores comprises a first affinity score for a first category of the plurality of categories and a second affinity score for a second category of the plurality of categories, the second affinity score being lower than the first affinity score;
    selecting, based on the first category, a first set of content items of the plurality of content items, the first set of content items comprising a first number of content items determined based on the first affinity score; and
    in response to determining that the second affinity score is lower than the first affinity score, selecting, based on the second category, a second set of content items of the plurality of content items that includes a second number of content items fewer than the first number of content items.

5. The system of claim 2, wherein the operations further comprise: prior to reconnecting of the account via the session: determining, via the hardware processing circuitry, based on the set of long term affinity scores, a first ranking for content.

6. The system of claim 2, wherein the operations further comprise periodically determining new content rankings, wherein a time period during which the activity is performed by the account during the established session is shorter than a time period associated with the set of long term affinity scores.

7. The system of claim 2, wherein the operations further comprise determining, via the hardware processing circuitry, characteristics of the account based on the content viewing activity of the account during the established session, the characteristics representing current content viewing preferences associated with the account comprising the set of short term affinity scores for the plurality of categories of content.

8. The system of claim 7, wherein the characteristics that represent the current content viewing preferences associated with the account comprise affinity scores for the categories of content.

9. The system of claim 2, the operations further comprising:
    selecting a list of a plurality of content items to display as the content based on the blended ranking;
    identifying one or more high priority content items; and
    randomly adding the one or more high priority content items into the list of the plurality of content items independently of the set of long term and set of short term affinity scores.

10. The system of claim 2, wherein the set of short term affinity scores for the plurality of categories of content is computed as a percentage of content classified as a respective category of the plurality of categories that is consumed by the account.

11. The system of claim 2, the operations further comprising:
    determining the characteristics of the plurality of user accounts based on content viewing activity of the plurality of user accounts over a first time period;
    clustering the characteristics of a plurality of users to generate a plurality of value sets, each value set defining value ranges for at least some of the characteristics, and each value set based on characteristics of at least two accounts;
    associating a content ranking with each of the plurality of value sets; and
    matching one of the plurality of value sets to the account based on the characteristics of the account.

12. The system of claim 11, wherein the generating of the plurality of value sets comprises generating at least a portion of the value sets to include blank or empty values for at least some of the plurality of characteristics.

13. The system of claim 11, the operations further comprising determining a value set having a highest number of characteristics of the account that fall within value ranges defined by the value set.

14. The system of claim 13, the operations further comprising associating a weight with each characteristic of the account, and wherein determining the matching value set comprises determining a value set having a highest weighted number of characteristics of the account that fall within the value ranges defined by the value set.

15. The system of claim 2, the operations further comprising:
periodically re-determining the characteristics of the plurality of user accounts based on content viewing activity of the plurality of user accounts over new periods of time; and
re-clustering the characteristics of a plurality of users to generate a plurality of value sets, each value set defining value ranges for at least some of the characteristics, and each value set based on characteristics of at least two accounts.

16. The system of claim 1, the operations further comprising:
storing historical information for a plurality of stories, the historical information indicating a user that viewed a story, whether the user clicked on the story, whether the user watched a complete story, and an amount of time the user watched the story; and
determining the ranking of content based on the stored historical information.

17. The system of claim 1, the operations further comprising generating the first ranking asynchronously and modifying the first ranking synchronously during the established session.

18. The system of claim 1, the operations further comprising:
generating a plurality of rankings;
selecting one of the rankings as the first ranking asynchronously based on the account;
generating the second ranking synchronously with the established session associated with the account; and
generating a third ranking by combining the selected one of the rankings with the generated second ranking.

19. A method, comprising:
detecting that an account is logging in to an application that was previously installed on a user device associated with the account to establish a session; and
in response to the detecting:
determining a first ranking of content based on a cluster of user interest during disconnected activity of the account;
identifying content viewing activity of the account in the application subsequent to the account logging into the application, the content viewing activity initiated by the account on the user device;
determining a second ranking of the content based on the content viewing activity;
determining a blended ranking of the content based on the first ranking for the cluster of user interest during the disconnected activity and the second ranking associated with the content viewing activity subsequent to the account logging into the application, the blended ranking reflecting both user activity during the disconnected activity and subsequent to the account logging into the application; and
generating for display, via the established session, the content based on the blended ranking.

20. A non-transitory computer readable medium comprising instructions that when executed configure hardware processing circuitry to perform operations comprising:
detecting that an account is logging in to an application that was previously installed on a user device associated with the account to establish a session; and
in response to the detecting:
determining a first ranking of content based on a cluster of user interest during disconnected activity of the account;
identifying content viewing activity of the account in the application subsequent to the account logging into the application, the content viewing activity initiated by the account on the user device;
determining a second ranking of the content based on the content viewing activity;
determining a blended ranking of the content based on the first ranking for the cluster of user interest during the disconnected activity and the second ranking associated with the content viewing activity subsequent to the account logging into the application, the blended ranking reflecting both user activity during the disconnected activity and subsequent to the account logging into the application; and
generating for display, via the established session, the content based on the blended ranking.

* * * * *